United States Patent
Shang et al.

(10) Patent No.: US 12,456,766 B1
(45) Date of Patent: Oct. 28, 2025

(54) DUAL-LEVEL THERMAL RUNAWAY WARNING METHOD AND SYSTEM OF LITHIUM BATTERY BASED ON SOUND SIGNAL

(71) Applicant: SHANDONG UNIVERSITY, Jinan (CN)

(72) Inventors: Yunlong Shang, Jinan (CN); Hankun Liu, Jinan (CN); Yue Wang, Jinan (CN); Chenghui Zhang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 19/090,520

(22) Filed: Mar. 26, 2025

(30) Foreign Application Priority Data

Sep. 23, 2024 (CN) .......................... 202411319776.X

(51) Int. Cl.
*H01M 10/48* (2006.01)
*G06N 20/00* (2019.01)

(52) U.S. Cl.
CPC .......... *H01M 10/486* (2013.01); *G06N 20/00* (2019.01); *H01M 2200/10* (2013.01)

(58) Field of Classification Search
CPC . H01M 10/486; H01M 2200/01; G06N 20/00
See application file for complete search history.

(56) References Cited

U.S. PATENT DOCUMENTS

| 11,682,492 | B2* | 6/2023 | Shoaran | G16H 50/30 |
| | | | | 705/2 |
| 12,168,943 | B2* | 12/2024 | O'Donnell | F03G 6/071 |
| 2022/0387796 | A1* | 12/2022 | Malter | A61N 1/0492 |
| 2023/0165558 | A1* | 6/2023 | Mosquera-Lopez | A61B 7/04 |
| | | | | 600/528 |
| 2023/0277118 | A1* | 9/2023 | Lucero | A61B 5/7267 |
| | | | | 600/544 |

(Continued)

FOREIGN PATENT DOCUMENTS

| CN | 111007461 A | 4/2020 |
| CN | 117977733 A | 5/2024 |

(Continued)

*Primary Examiner* — Tung S Lau
(74) *Attorney, Agent, or Firm* — IPro, PLLC; Na Xu

(57) ABSTRACT

The present invention provides a dual-level thermal runaway warning method of a lithium battery based on a sound signal, comprising: obtaining a battery sound signal sequence; performing outlier identification on the battery sound signal sequence, and providing a level-1 thermal runaway warning when an abnormal data point exists; extracting a time-frequency domain feature of the abnormal data point, and identifying a presence of a thermal runaway expansion sound through a sparrow search algorithm-optimized eXtreme Gradient Boosting (SSA-XGBoost) algorithm, to providing a level-2 thermal runaway warning. In the SSA-XGBoost algorithm, optimal parameter adjustment is performed on a number of iterations, a learning rate, and a decision tree depth of the XGBoost algorithm through the SSA. A dual-level thermal runaway warning strategy is adopted to perform grading identification on general anomalies or deep anomalies, thereby effectively improving identification accuracy of a weak abnormal sound signal in an early stage.

7 Claims, 4 Drawing Sheets

(56) References Cited

U.S. PATENT DOCUMENTS

2023/0333201 A1* 10/2023 Regani ................. G01S 13/86
2024/0170740 A1* 5/2024 Tomar ................. B60L 3/0046

FOREIGN PATENT DOCUMENTS

| CN | 118017058 A | 5/2024 |
| CN | 118024950 A | 5/2024 |
| CN | 118040239 A | 5/2024 |

* cited by examiner

DUAL-LEVEL THERMAL RUNAWAY WARNING METHOD AND SYSTEM OF LITHIUM BATTERY BASED ON SOUND SIGNAL

CROSS-REFERENCE TO RELATED APPLICATIONS

The present invention claims priority to Chinese Patent Application No. 202411319776.X, filed with the China National Intellectual Property Administration on Sep. 23, 2024 and entitled "DUAL-LEVEL THERMAL RUNAWAY WARNING METHOD AND SYSTEM OF LITHIUM BATTERY BASED ON SOUND SIGNAL", which is incorporated herein by reference in its entirety and constitutes a part of the present invention for all purposes.

TECHNICAL FIELD

The present invention relates to the field of warning technologies for thermal runaway of a battery, and in particular, to a dual-level thermal runaway warning method and system of a lithium battery based on a sound signal.

BACKGROUND

The description in this part merely provides background information related to the present invention and does not necessarily constitute the prior art.

A lithium-ion battery may experience performance degradation under conditions of electrical, thermal, and mechanical abuse, posing a potential risk of thermal runaway, which may ultimately lead to safety accidents such as battery fire and explosion. It is an important means to avoid a safety accident to efficiently detect a thermal runaway signal in an early stage of battery failure. However, it is extremely difficult to accurately warn battery thermal runaway due to extremely strong concealment of the battery thermal runaway in the early stage and strong suddenness in a final stage. Therefore, how to nip in the bud and implement early warning of thermal runaway is a key technical problem to be resolved urgently at present.

Currently, a temperature feature of a lithium-ion battery is used as a warning signal of battery thermal runaway in patents CN202410203187.9 and CN202410362650.4. A voltage feature in a lithium-ion battery is used as a warning signal of battery thermal runaway in patents CN202211310144.8 and CN202410285376.5. Both the identification methods may achieve the purpose of improving safety of the lithium-ion battery.

However, temperature and voltage signals have obvious lags in battery thermal runaway, and often cannot be detected in an early stage of thermal runaway, which leads to delayed warning, and it is still impossible to effectively and timely realize early warning for thermal runaway. In patent CN111007461A, a thermal runaway positioning system for a lithium battery based on a sound signal is constructed based on an XGBoost algorithm, and thermal runaway warning is implemented by detecting a relief sound of a safety valve. However, since a pouch battery is not equipped with a safety valve, a sound in an early stage of thermal runaway is difficult to perceive, which may result in a failure of the method. In addition, when a relief sound of the safety valve occurs in a battery, the battery is already in a dangerous state for a short warning duration. Therefore, how to capture a faint sound signal in the early stage of thermal runaway remains to be resolved.

SUMMARY

To resolve the foregoing problem, the present invention provides a dual-level thermal runaway warning method and system of a lithium battery based on a sound signal. A dual-level thermal runaway warning strategy is adopted to perform grading identification on general anomalies or deep anomalies. First, outlier detection is performed on the sound signal to perform preliminary screening on superficial faults. Then, a thermal runaway expansion sound identifier is constructed based on a sparrow search algorithm-optimized eXtreme Gradient Boosting (SSA-XGBoost) algorithm. The SSA is adopted to perform optimal parameter adjustment to enhance identification accuracy of a weak abnormal sound signal in an early stage. In this way, a level-2 thermal runaway warning is provided.

In order to achieve the above objective, the present invention adopts the following technical solutions.

According to a first aspect, the present invention provides a dual-level thermal runaway warning method of a lithium battery based on a sound signal, including:

obtaining a battery sound signal sequence of a to-be-detected lithium battery;

providing a level-1 thermal runaway warning: performing outlier identification on the battery sound signal sequence, and marking a sound point with an anomaly score as an abnormal data point based on a set threshold; and giving an alarm prompt when an abnormal data point exists, to prompt that the to-be-detected lithium battery is abnormal and may have a risk of thermal runaway; and providing a level-2 thermal runaway warning: extracting time-frequency domain features of a detected abnormal data point, and identifying a presence of a thermal runaway expansion sound through an SSA-XGBoost algorithm; and immediately cutting off a battery charging and discharging circuit when the thermal runaway expansion sound exists, simultaneously performing ventilation and cooling, and replacing the to-be-detected lithium battery.

In the SSA-XGBoost algorithm, optimal parameter adjustment is performed on a number of iterations, a learning rate, and a decision tree depth of the XGBoost algorithm through the SSA.

In an optional implementation, outlier identification is performed through an isolation forest algorithm, an average path length of each data point in an isolation tree is calculated by using a Mel-spectrogram feature as an identification feature, an anomaly score is calculated based on the average path length, and an abnormal data point is identified based on comparison of the anomaly score and a set anomaly threshold.

In an optional implementation, the average path length is:

$$L(s) = 2(\ln(s-1) + 0.5772156649) - \frac{2(s-1)}{s};$$

and, the anomaly score is:

$$C(m,s) = 2\frac{E(\ln(m) + 0.5772156649)}{L(s)};$$

where s is a sample, m is a Mel-spectrogram feature, and E(ln(m)+0.5772156649) is a sample expectation.

In an optional implementation, the extracted time-domain feature is root mean square (RMS) energy, and the extracted frequency-domain features are Mel-frequency cepstral coefficients (MFCCs), formant energy, and a spectral centroid.

In an optional implementation, a process of performing optimal parameter adjustment through the SSA includes: setting a range of each of the number of iterations, the learning rate, and the decision tree depth, where each sparrow represents a parameter combination including the number of iterations, the learning rate, and the decision tree depth, defining a fitness function, and updating a population position through foraging and vigilance strategies of the sparrow to gradually approximate an optimal parameter combination until a maximum number of iterations is reached, to obtain the optimal parameter combination.

In an optional implementation, a loss function of the SSA-XGBoost algorithm is:

$$Q_{obj} = \sum_{i=1}^{n} X(p_i, q_i) + \sum_{h=1}^{H} \theta(f_h);$$

where, $X(p_i, q_i)$ is a loss function of a key dynamic eigenvalue and a predicted value, $$\sum_{h=1}^{H} \theta(f_h)$$

is a regularization term, $p_i$ is an $i^{th}$ key dynamic eigenvalue, $q_i$ is a predicted value corresponding to $p_i$, and n is a quantity of abnormal data points.

An objective of the SSA-XGBoost algorithm is to minimize an expected value of the loss function by constructing a decision tree, perform Taylor expansion on the loss function and calculate a derivation, and finally obtain an optimal solution of an objective function as follows:

$$Q'_{obj} = -\frac{1}{2} \sum_{j=1}^{Le} \frac{D_j^2}{E_j + \alpha} + \alpha Le;$$

where, Le is a quantity of branches in the decision tree, $D_j$ and $E_j$ are respectively a first-order gradient function and a second-order gradient function, and a is a penalty coefficient.

According to a second aspect, the present invention provides a dual-level thermal runaway warning system of a lithium battery based on a sound signal, including:
an obtaining module, configured to obtain a battery sound signal sequence of a to-be-detected lithium battery;
a level-1 warning module, configured to perform outlier identification on the battery sound signal sequence, mark a sound point with an anomaly score as an abnormal data point based on a set threshold, and give an alarm prompt when an abnormal data point exists, to prompt that the to-be-detected lithium battery is abnormal and may have a risk of thermal runaway; and
a level-2 warning module, configured to extract time-frequency domain features of a detected abnormal data point, identify a presence of a thermal runaway expansion sound through an SSA-XGBoost algorithm, immediately cut off a battery charging and discharging circuit when the thermal runaway expansion sound exists, simultaneously perform ventilation and cooling, and replace the to-be-detected lithium battery.

In the SSA-XGBoost algorithm, optimal parameter adjustment is performed on a number of iterations, a learning rate, and a decision tree depth of the XGBoost algorithm through the SSA.

According to a third aspect, the present invention provides an electronic device, including a memory, a processor, and a computer instruction stored in the memory and executable on the processor, where when the computer instruction is executed by the processor, the method according to the first aspect is performed.

According to a fourth aspect, the present invention provides a computer-readable storage medium configured to store a computer instruction, where when the computer instruction is executed by a processor, the method according to the first aspect is performed.

According to a fifth aspect, the present invention provides a computer program product, including a computer program, where when the computer program is executed by a processor, the method according to the first aspect is implemented.

Compared with the prior art, the beneficial effects of the present invention are as follows.

Through extraction of multi-domain features of sound waves in an early stage of thermal runaway, and based on the SSA-XGBoost algorithm, the present invention proposes a dual-level thermal runaway warning method of a lithium-ion pouch battery based on multi-domain fusion of sound signals. Compared with the existing warning method for thermal runaway of a lithium battery, the present invention has the following advantages:

(1) The present invention does not require establishment of a mathematical model of a battery, but only relies on a directly measured sound signal. A sound signal feature has advantages of an early warning time and high sensitivity, and can provide early warning for thermal runaway of the lithium-ion battery when parameters such as a current, a voltage, and a temperature have not shown significant changes.

(2) The present invention adopts a dual-level thermal runaway warning strategy to perform grading identification on general abnormal samples or deep abnormal samples. First, outlier detection is performed on a battery sound signal sequence through an isolation forest algorithm, to provide a level-1 thermal runaway warning, quickly handle a fault through a threshold, and perform preliminary screening on superficial faults. Then, to make full use of dynamic characteristics of the sound of the lithium-ion battery in a charging and discharging process, a quantity of features is expanded, multi-domain analysis is performed on an abnormal data point during level-2 thermal runaway anomaly detection, time-frequency domain features are extracted as a key dynamic feature, and a level-2 thermal runaway warning is implemented based on the key dynamic feature and through the SSA-XGBoost algorithm, thereby effectively enhancing identification accuracy of a weak abnormal sound signal in an early stage.

(3) The present invention adopts the SSA-XGBoost algorithm to provide a level-2 thermal runaway warning. The number of iterations, the learning rate, and the decision tree depth in the XGBoost algorithm are important parameters that affect precision of the algorithm. However, an optimal parameter solution cannot be obtained generally through artificial adjustment of parameters. Therefore, the SSA is adopted to perform optimal parameter adjustment to enhance classification performance and improve calculation efficiency, so that a thermal runaway phenomenon can be identified more rapidly, thereby reserving sufficient time for taking safety measures.

Additional aspects and advantages of the present invention are to be provided in part in the following description and in part become apparent from the following description, or are learned through practice of the present invention.

BRIEF DESCRIPTION OF THE DRAWINGS

To describe the technical solutions in examples of the present invention or in the related art more clearly, the accompanying drawings required for describing the examples or the related art are briefly described below. Apparently, the accompanying drawings in the following description merely show examples of the present invention, and a person of ordinary skill in the art may still derive other accompanying drawings from the provided accompanying drawings without creative efforts.

DETAILED DESCRIPTION

The present invention is further described below with reference to the accompanying drawings and examples.

It should be pointed out that the following detailed descriptions are all exemplary and are intended to provide further descriptions of the present invention. Unless otherwise specified, all technical and scientific terms used herein have the same meaning as commonly understood by a person of ordinary skill in the art to which the present invention belongs.

It should be noted that the terms used herein are merely for describing specific implementations, and are not intended to limit exemplary implementations according to the present invention. As used herein, unless clearly indicated in the context, singular forms are also intended to include plural forms. In addition, it should be further understood that terms "include", "including", and any other variants are intended to cover non-exclusive inclusion. For example, a process, a method, a system, a product, or a device that includes a list of steps or units is not necessarily limited to those expressly listed steps or units, but may include other steps or units not expressly listed or inherent to the process, the method, the product, or the device.

The examples in the present invention and features in the examples may be combined with each other in a case that no conflict occurs.

Example 1

The present example provides a dual-level thermal runaway warning method of a lithium battery based on a sound signal, including:
obtaining a battery sound signal sequence of a to-be-detected lithium battery;
providing a level-1 thermal runaway warning: performing outlier identification on the battery sound signal sequence, and marking a sound point with an anomaly score as an abnormal data point based on a set threshold; and giving an alarm prompt when an abnormal data point exists, to prompt that the to-be-detected lithium battery is abnormal and may have a risk of thermal runaway;
providing a level-2 thermal runaway warning: extracting time-frequency domain features of a detected abnormal data point, and identifying a presence of a thermal runaway expansion sound through a sparrow search algorithm-optimized eXtreme Gradient Boosting (SSA-XGBoost) algorithm; and immediately cutting off a battery charging and discharging circuit when the thermal runaway expansion sound exists, simultaneously performing ventilation and cooling, and replacing the to-be-detected lithium battery.

In the SSA-XGBoost algorithm, optimal parameter adjustment is performed on a number of iterations, a learning rate, and a decision tree depth of the XGBoost algorithm through the SSA.

Figure 1:
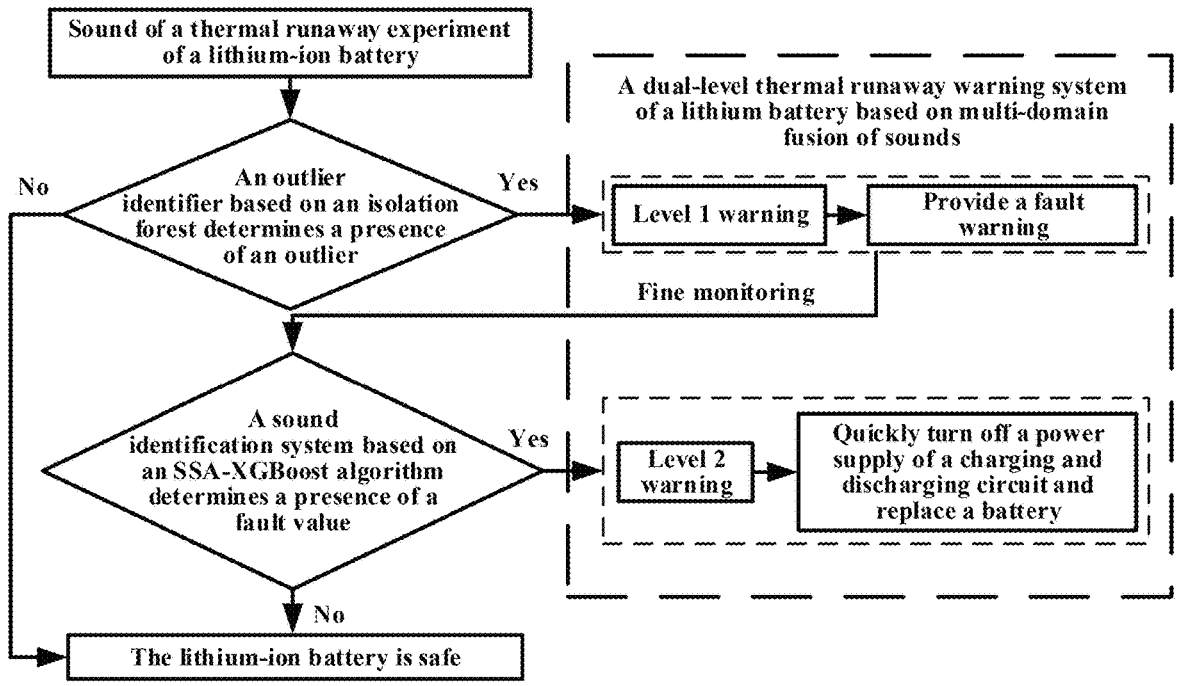
FIG. 1 is a flowchart of a dual-level thermal runaway warning method of a lithium battery based on multi-domain fusion of sound signals according to Example 1 of the present invention.

According to the foregoing dual-level thermal runaway warning method shown in FIG. 1, outlier detection is performed on a collected battery sound signal sequence through an isolation forest algorithm, and a sound point with an anomaly score is marked as an abnormal data point based on a set threshold, so as to provide a level-1 thermal runaway warning. A fault may be quickly handled through a threshold, but only a superficial fault can be preliminarily screened.

Based on a fact that the abnormal data point is detected through the level-1 thermal runaway warning, the level-2 thermal runaway anomaly detection is performed on samples of multi-dimensional key dynamic features based on the SSA-XGBoost algorithm. During the level-2 thermal runaway anomaly detection, multi-domain analysis is first performed on the abnormal data point, and in time domain, root mean square (RMS) energy is selected as a key dynamic feature. In frequency domain, Mel-frequency cepstral coefficients (MFCCs), formant energy, and a spectral centroid are selected as key dynamic features. Based on the foregoing key dynamic features, the SSA-XGBoost algorithm is adopted to distinguish an abnormal value of thermal runaway from a normal operation sound, thereby implementing the level-2 thermal runaway warning.

The dual-level thermal runaway warning method of a lithium-ion pouch battery provided in the present invention does not require establishment of a mathematical model of the battery, and relies only on directly measured sound sampling data. Based on the multi-domain analysis, a plurality of key dynamic features in the time domain and the frequency domain are fused to construct a sound identification system, thereby improving accuracy of thermal runaway identification of the system.

The method of the present example is described in detail below.

Since a thermal runaway experiment of a lithium-ion battery has characteristics of a long duration and a large amount of information, a fast-updating outlier monitor is needed to implement real-time monitoring of an operating state of the lithium-ion battery. In view of efficient calculation and strong robustness of the isolation forest algorithm, an outlier monitor based on an isolation forest is established for sound data of the thermal runaway experiment of the lithium-ion battery in the present example.

It is assumed that s pieces of experimental data are provided in the thermal runaway experiment of the lithium-ion battery. First, a plurality of subsamples is randomly extracted from the experimental data for thermal runaway of the lithium-ion battery, and an isolation tree is constructed for each subsample.

The lithium-ion pouch battery has a faint expansion sound during a thermal runaway, and no significant difference exists in amplitude of the experimental data thereof. Therefore, a Mel-spectrogram feature is selected as an identification feature $M=\{m_1, m_2, \ldots, m_s\}$. The Mel-spectrogram feature is a spectrum representation of an audio signal on a Mel scale. The Mel scale is a frequency scale that approximates auditory perception of human ears. Therefore, the Mel-spectrogram feature is selected to well reflect a difference in perception of human ears at different frequencies.

The data is recursively split by performing random cuts on the selected Mel-spectrogram feature, until data points on a node are isolated. Since an outlier has characteristics of a small quantity and a great difference from a normal value, the outlier is more likely to be isolated in the isolation forest and has a shorter average path.

Therefore, an average path length of each data point in the isolation tree is calculated for identifying the abnormal data point. The average path length L(s) is:

$$L(s) = 2(\ln(s-1) + 0.5772156649) - \frac{2(s-1)}{s} \quad (1)$$

Then, an anomaly score is calculated through the average path length, and the anomaly score is:

$$C(m, s) = 2^{-\frac{E(\ln(m)+0.5772156649)}{L(s)}} \quad (2)$$

Where, s is a sample, m is a Mel-spectrogram feature, and $E(\ln(m)+0.5772156649)$ is a sample expectation.

In order to improve stability of thermal runaway anomaly detection of the lithium-ion battery and reduce an identification rate for a sensitive anomaly, an anomaly threshold is set to 0.1% in the present example. Finally, an abnormal data point at which thermal runaway may occur is identified based on comparison of the anomaly score and the anomaly threshold, thereby implementing level-1 thermal runaway anomaly detection of the lithium-ion battery. When a level-1 thermal runaway anomaly occurs, a fault warning should be provided as a notification.

Since a certain limitation exists in determining thermal runaway only through a single-feature Mel spectrogram, in order to make full use of dynamic characteristics of a sound during charging and discharging of the lithium-ion battery, a quantity of features is expanded, and multi-domain analysis is performed in the level-2 thermal runaway anomaly detection. In the time domain, the RMS energy is selected as a key dynamic feature of the sound identification system. In the frequency domain, the MFCCs, the formant energy, and the spectral centroid are selected as the key dynamic features.

XGBoost is a gradient-boosted decision tree algorithm, which can automatically learn complex relationships among key dynamic features, and is suitable for processing high-dimensional data with a non-linear relationship. An optimal hyper-parameter combination of an XGBoost model may be automatically searched through the SSA, thereby enhancing classification performance and improving calculation efficiency. Based on the foregoing advantages, the SSA-XGBoost algorithm is selected to perform the level-2 thermal runaway anomaly detection in the present example.

When the XGBoost algorithm is used for classification, the core idea is to train a sound decision tree of each category based on an iteration method, and gradually improve model performance through a gradient boosting method, thereby achieving the best sound identification effect.

First, n abnormal data points obtained through the level-1 thermal runaway anomaly detection are defined as a data set $A=\{(p_i, q_i): i=1, \ldots, n, p_i \in R, q_i \in R\}$ for the level-2 thermal runaway anomaly detection, where $p_i$ represents an $i^{th}$ key dynamic eigenvalue, and $q_i$ represents a predicted value corresponding to $p_i$. The predicted value is:

$$q_i = \sum_{h=1}^{H} f_h(p_i), f_h(p_i) \in R \quad (3)$$

Where, H is a quantity of sub-regression trees, and $f_h$ is a corresponding learning function on the decision tree.

A corresponding objective function obtained through cumulative iterations is:

$$Q_{obj} = \sum_{i=1}^{n} X(p_i, q_i) + \sum_{h=1}^{H} \theta(f_h) \quad (4)$$

Where, $X(p_i, q_i)$ is a loss function of a true key dynamic eigenvalue and a predicted value, and $$\sum_{h=1}^{H} \theta(f_h)$$

is a regularization term, to avoid overfitting.

An objective of the XGBoost algorithm is to minimize an expected value of the loss function by constructing a decision tree, perform Taylor expansion on Equation (4) and calculate a derivation, and finally obtain an optimal solution of an objective function as follows:

$$Q'_{obj} = -\frac{1}{2} \sum_{j=1}^{Le} \frac{D_j^2}{E_j + \alpha} + \alpha Le \quad (5)$$

Where, Le is a quantity of branches in the decision tree, $D_j$ and $E_j$ are respectively a first-order gradient function and a second-order gradient function of $f_h$, and $\alpha$ is a penalty coefficient.

In the XGBoost algorithm, the number of iterations, the learning rate, and the decision tree depth are important parameters that affect precision of the algorithm. However, an optimal parameter solution cannot be obtained generally through artificial adjustment of parameters. Therefore, in the present example, optimal parameter adjustment is performed through the SSA. First, a parameter of the SSA is initialized, and a range of each of the number of iterations, the learning rate, and the decision tree depth is set. Each sparrow herein represents a parameter combination including the number of iterations, the learning rate, and the decision tree depth. A fitness function is defined to estimate performance of each sparrow. Then, a population position is updated through foraging and vigilance strategies of the sparrow, to gradually approximate an optimal parameter combination. The process is repeated until a maximum number of iterations is reached, and the optimal parameter combination is finally outputted.

Figure 2:
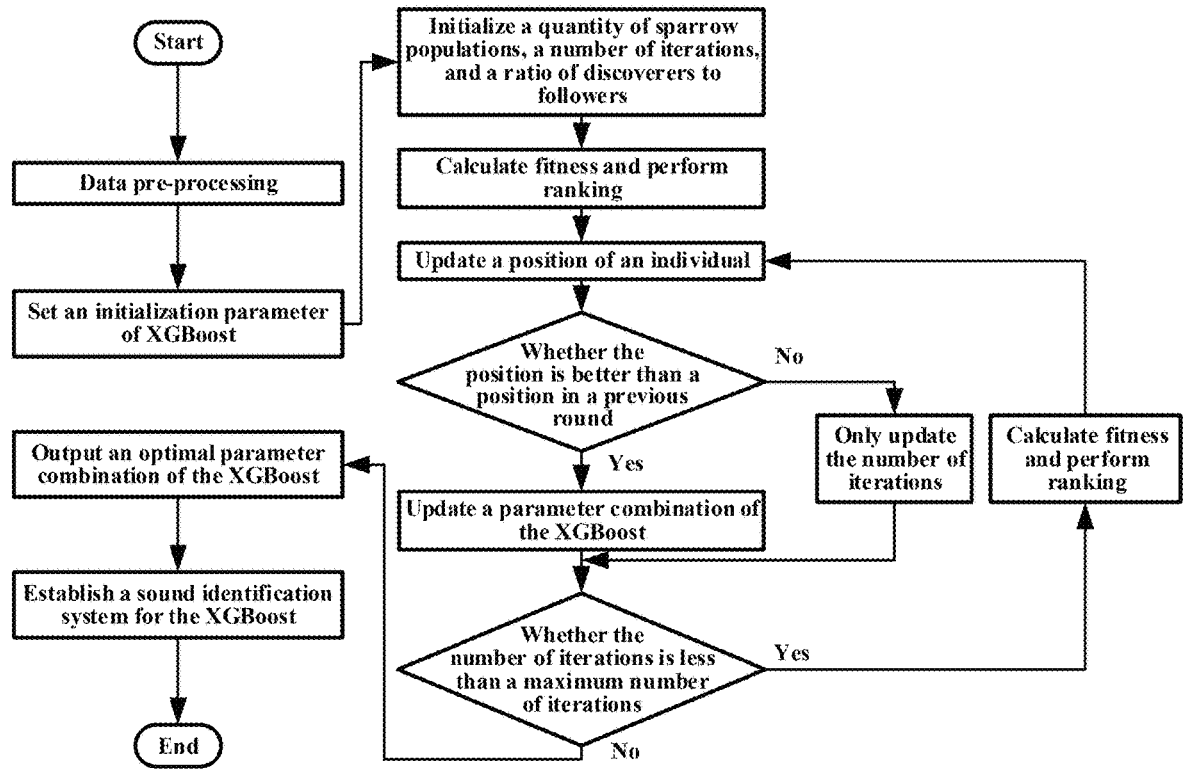
FIG. 2 is a flowchart of a level-2 thermal runaway warning according to Example 1 of the present invention.

Finally, a flowchart of level-2 thermal runaway anomaly detection based on the SSA-XGBoost algorithm is shown in FIG. 2. An abnormal data point obtained through the level-1 thermal runaway anomaly detection is used as an input, and a presence of a level-2 thermal runaway anomaly detection value is identified based on the foregoing SSA-XGBoost algorithm. If the value is identified, a power supply is immediately cut off, ventilation and cooling are simultaneously performed, a fault condition is checked, and battery replacement is performed.

Based on the above, in the present example, the battery sound signal sequence is obtained, and a collected sound signal is determined through the foregoing method. When a level-1 thermal runaway anomaly is determined based on the sound signal, a fault warning is provided. When a level-2 thermal runaway anomaly is determined based on the sound signal, the power supply should be quickly turned off, and the battery is checked, thereby achieving the purpose of diagnosis of thermal runaway.

Figure 3A:
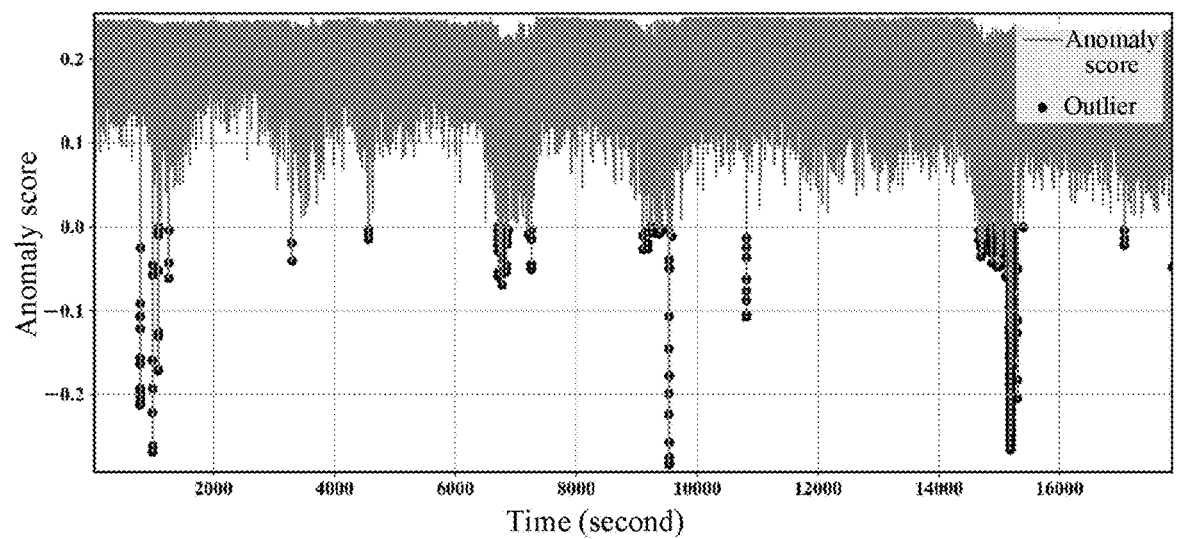
FIG. 3A is a schematic diagram of outlier detection of sound samples in a 3.5 C magnification cyclic thermal runaway experiment according to Example 1 of the present invention.
Figure 3B:
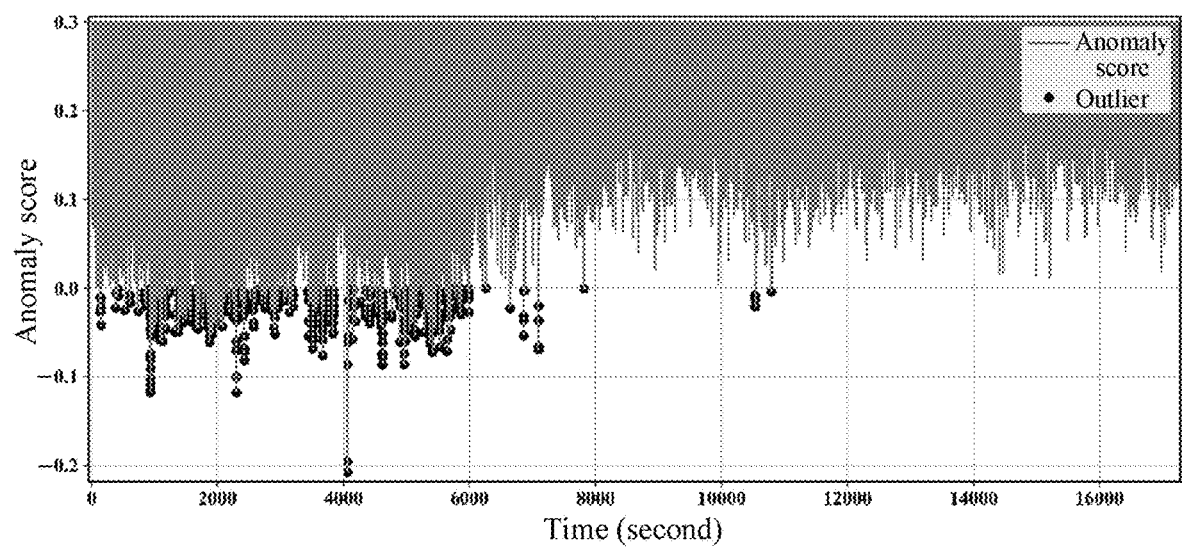
FIG. 3B is a schematic diagram of outlier detection of sounds in a 110% state of charge (SOC) cyclic overcharge thermal runaway experiment according to Example 1 of the present invention.
Figure 3C:
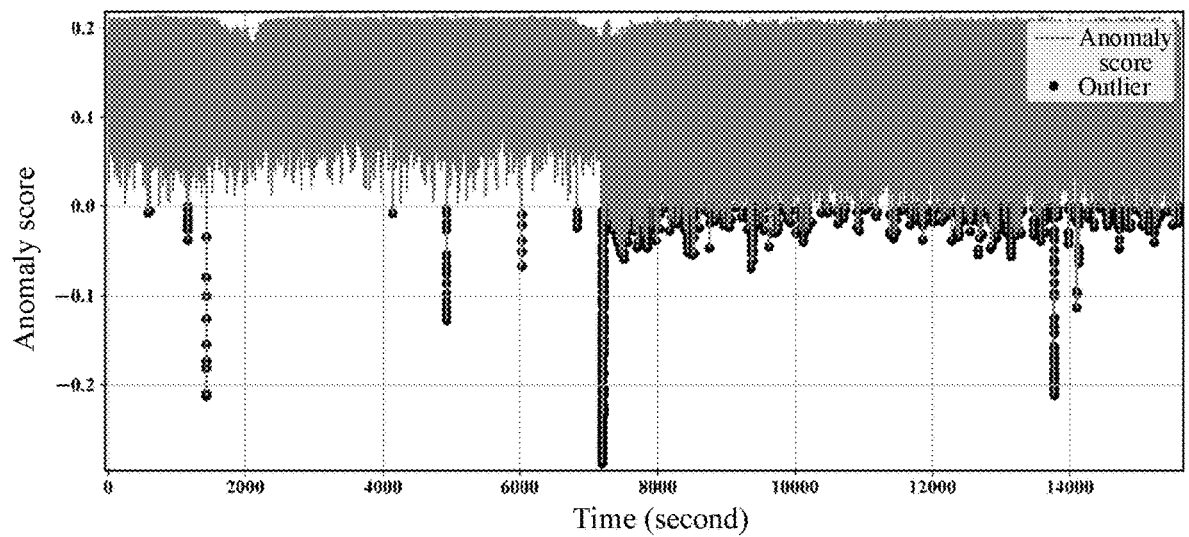
FIG. 3C is a schematic diagram of outlier detection of sound samples in a 125% SOC cyclic overcharge thermal runaway experiment according to Example 1 of the present invention.

Use case:

A thermal runaway experiment is performed on a 3.9 Ah lithium cobalt pouch battery core under different conditions in an accelerating rate calorimeter. Experimental conditions include a 3.5 C magnification cycle, an overcharge cycle in an SOC of 110%, and an overcharge cycle in an SOC of 125%, until thermal runaway occurs. During the experiment, a sound signal of the battery core is sampled and recorded, and an outlier detection method based on an isolation forest is adopted in level-1 thermal runaway anomaly detection, to obtain detection results in three experimental conditions. As shown in FIG. 3A to FIG. 3C, a sound sample that may include a thermal expansion sound of the battery may be screened out through the level-1 thermal runaway anomaly detection. It may be seen that a score corresponding to a detected outlier is obviously less than that of another point.

After a suspicious abnormal sound sample is screened out, level-2 thermal runaway anomaly detection is performed on the suspicious abnormal sound sample. During the level-2 anomaly detection, the RMS is solved and short-time Fourier transform are performed on abnormal data through multi-domain analysis, and corresponding RMS energy, MFCCs, formant energy, and a spectral centroid thereof are recorded. The four key dynamic features are used as inputs and transmitted to the sound identification system based on the SSA-XGBoost algorithm. 80% of the data set is used as a training set, 20% is used as a testing set, and the data is randomly divided.

Figure 4:
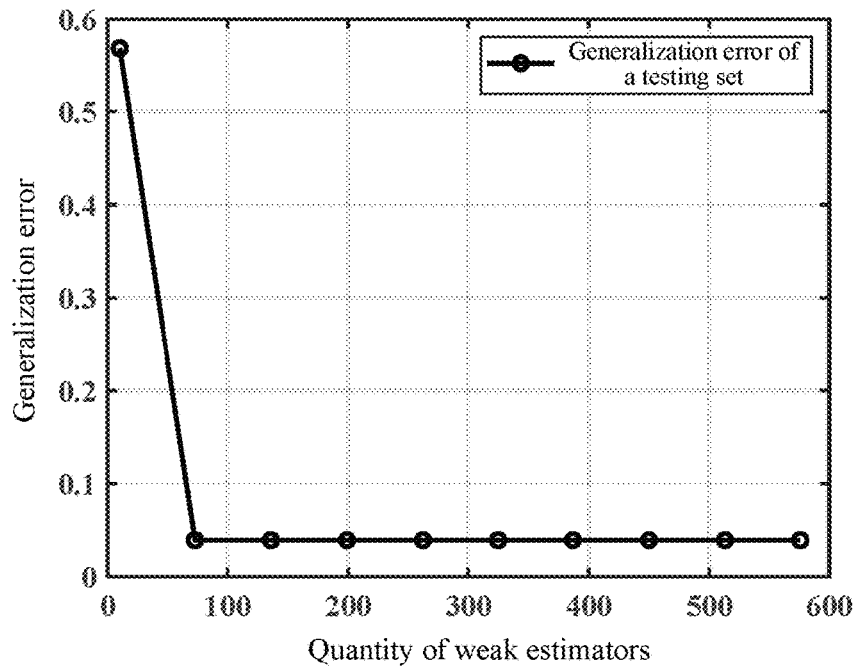
FIG. 4 is a schematic diagram of estimation results of generalization ability based on a sparrow search algorithm-eXtreme Gradient Boosting (SSA-XGBoost) algorithm according to Example 1 of the present invention.
Figure 5A:
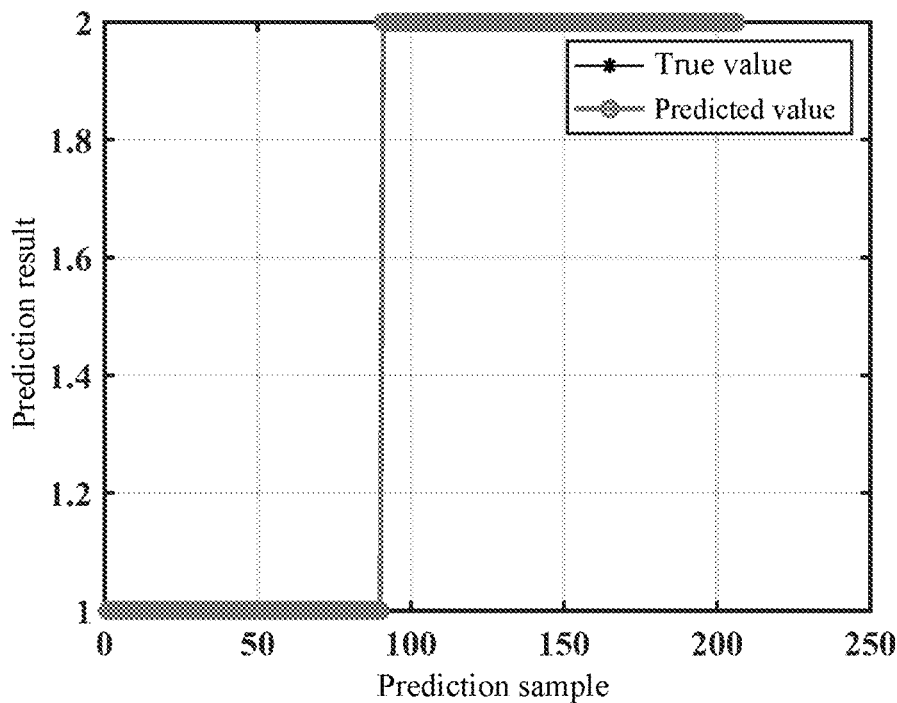
FIG. 5A is a diagram of a classification result of a training set based on an SSA-XGBoost algorithm according to Example 1 of the present invention.
Figure 5B:
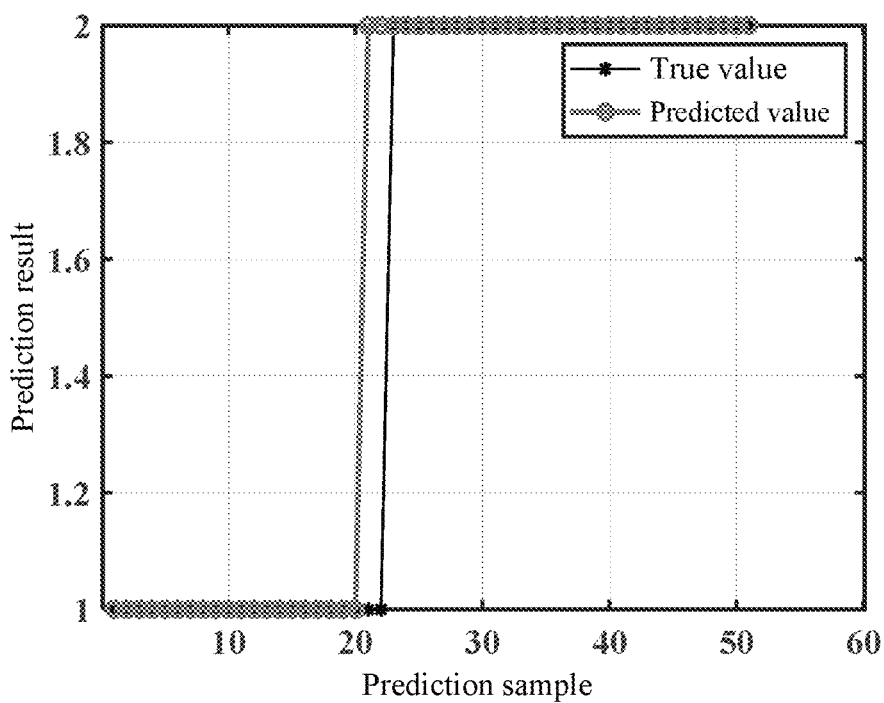
FIG. 5B is a diagram of a classification result of a testing set based on an SSA-XGBoost algorithm according to Example 1 of the present invention.

FIG. 4 shows estimation of generalization ability of data of a testing set under different quantities of weak estimators in a sound estimation system based on the SSA-XGBoost algorithm. It may be learned from FIG. 4 that the generalization ability of the system increases as the quantity of weak estimators increases, and a generalization error thereof continuously decreases. An error of the testing set is maintained at 0.039 particularly when more than 63 weak estimators are used, which indicates that the model has a good ensemble learning effect and generalization ability. Finally, classification results corresponding to the training set and the testing set are shown in FIG. 5A to FIG. 5B.

In order to verify accuracy of the experiment, a mean square error (MSE), accuracy, and a determination coefficient $R^2$ are used as evaluation indicators, and corresponding evaluation results thereof are shown in Table 1.

TABLE 1

| Evaluation results | | |
| --- | --- | --- |
| Evaluation method | Calculation result | Evaluation |
| MSE | 0.0392 | A value of the MSE is very small, indicating that an average error between a predicted value and an actual value is very small. |
| Accuracy | 96.0% | A sound classification system model can accurately identify most samples. |
| Determination coefficient $R^2$ | 0.8401 | The model can explain 84.01% of a variance of a dependent variable, and has a good fitting effect. |

It may be seen that the sound identification system based on the SSA-XGBoost algorithm as the level-2 thermal runaway anomaly detection may effectively identify a weak sound signal in the early stage of thermal runaway.

Based on the above, in this specification, the SSA-XGBoost algorithm is adopted to establish a dual-level thermal runaway warning strategy based on sound wave information directly collected in the experimental process and through multi-domain analysis, thereby implementing identification of the weak sound signal in the early stage of thermal runaway of the lithium-ion pouch battery, improving safety of the lithium-ion pouch battery during use, and realizing higher application value.

Example 2

The present example provides a dual-level thermal runaway warning system of a lithium battery based on a sound signal, including:

an obtaining module, configured to obtain a battery sound signal sequence;

a level-1 warning module, configured to perform outlier identification on the battery sound signal sequence, mark a sound point with an anomaly score as an abnormal data point based on a set threshold, and give an alarm prompt when an abnormal data point exists, to prompt that the to-be-detected lithium battery is abnormal and may have a risk of thermal runaway; and a level-2 warning module, configured to extract time-frequency domain features of a detected abnormal data point, identify a presence of a thermal runaway expansion sound through an SSA-XGBoost algorithm, immediately cut off a battery charging and discharging circuit when the thermal runaway expansion sound exists, simultaneously perform ventilation and cooling, and replace the to-be-detected lithium battery.

In the SSA-XGBoost algorithm, optimal parameter adjustment is performed on a number of iterations, a learning rate, and a decision tree depth of the XGBoost algorithm through the SSA.

In an optional implementation, outlier identification is performed through an isolation forest algorithm, an average path length of each data point in an isolation tree is calculated by using a Mel-spectrogram feature as an identification feature, an anomaly score is calculated based on the average path length, and an abnormal data point is identified based on comparison of the anomaly score and a set anomaly threshold.

In an optional implementation, the average path length is:

$$L(s) = 2(\ln(s-1) + 0.5772156649) - \frac{2(s-1)}{s};$$

and, the anomaly score is:

$$C(m, s) = 2 \frac{E(\ln(m) + 05772156649)}{L(s)};$$

where s is a sample, m is a Mel-spectrogram feature, and $E(\ln(m)+0.5772156649)$ is a sample expectation.

In an optional implementation, the extracted time-domain feature is RMS energy, and the extracted frequency-domain features are Mel-frequency cepstral coefficients (MFCCs), formant energy, and a spectral centroid.

In an optional implementation, a process of performing optimal parameter adjustment through the SSA includes: setting a range of each of the number of iterations, the learning rate, and the decision tree depth, where each sparrow represents a parameter combination including the number of iterations, the learning rate, and the decision tree depth, defining a fitness function, and updating a population position through foraging and vigilance strategies of the sparrow to gradually approximate an optimal parameter combination until a maximum number of iterations is reached, to obtain the optimal parameter combination.

In an optional implementation, a loss function of the SSA-XGBoost algorithm is:

$$Q_{obj} = \sum_{i=1}^{n} X(p_i, q_i) + \sum_{h=1}^{H} \theta(f_h);$$

where, $X(p_i, q_i)$ is a loss function of a key dynamic eigenvalue and a predicted value, $$\sum_{h=1}^{H} \theta(f_h)$$

is a regularization term, $p_i$ is an $i^{th}$ key dynamic eigenvalue, $q_i$ is a predicted value corresponding to $p_i$, and n is a quantity of abnormal data points.

An objective of the SSA-XGBoost algorithm is to minimize an expected value of the loss function by constructing a decision tree, perform Taylor expansion on the loss function and calculate a derivation, and finally obtain an optimal solution of an objective function as follows:

$$Q'_{obj} = -\frac{1}{2} \sum_{j=1}^{Le} \frac{D_j^2}{E_j + \alpha} + \alpha Le;$$

where, Le is a quantity of branches in the decision tree, $D_j$ and $E_j$ are respectively a first-order gradient function and a second-order gradient function, and a is a penalty coefficient.

It should be noted herein that the foregoing modules correspond to the steps in Example 1, and examples and application scenarios implemented by the foregoing modules and the corresponding steps are the same, but are not limited to the content disclosed in Example 1. It should be noted that the foregoing modules as a part of the system may be executed in a computer system storing a set of computer-executable instructions.

In more examples, an electronic device is further provided, including a memory, a processor, and a computer instruction stored in the memory and executable on the processor, where when the computer instruction is executed by the processor, the method in Example 1 is performed. For brevity, details are not described herein again.

It is to be understood that in the present example, the processor may be a central processing unit (CPU). The processor may be further another general-purpose processor, a digital signal processor (DSP), an application-specific integrated circuit (ASIC), a field-programmable gate array (FPGA), or another programmable logic device, a discrete gate or transistor logic device, a discrete hardware component, or the like. The general-purpose processor may be a microprocessor, the processor may also be any conventional processor, or the like.

The memory may include a read-only memory and a random access memory, and provide instructions and data to the processor. A part of the memory may further include a nonvolatile random access memory. For example, the memory may further store information about a device type.

A computer-readable storage medium is configured to store a computer instruction, where when the computer instruction is executed by a processor, the method in Example 1 is performed.

The method in Example 1 may be directly performed by a hardware processor, or may be performed through a combination of hardware and software modules in the processor. The software module may be located in a mature storage medium in the art, such as a random access memory, a flash memory, a read-only memory, a programmable read-only memory, an electrically-erasable programmable memory, a register, or the like. The storage medium is located in the memory, and the processor reads information in the memory and performs the steps of the foregoing method through hardware thereof. To avoid repetition, details are not described herein again.

A computer program product includes a computer program, the computer program, when executed by a processor, implementing the method in Example 1.

The present invention further provides at least one computer program product tangibly stored in a non-transitory computer-readable storage medium. The computer program product includes a computer-executable instruction, for example, an instruction in a program module, which is executed in a device on a real or virtual processor of a target, to perform the foregoing process/method. Generally, the program module includes a routine, a program, a bank, an object, a class, an assembly, a data structure, or the like that performs a particular task or implements a particular abstract data type. In various examples, functions of the program modules may be combined or divided between the program modules as required. A machine-executable instruction for the program module may be executed in a local or distributed device. In the distributed device, the program module may be located in local and remote storage media.

Computer program codes for implementing the method of the present invention may be written in one or more programming languages. The computer program codes may be provided to a general-purpose computer, a special-purpose computer, or a processor of another programmable data processing apparatus, the program codes, when executed by the computer or the another programmable data processing apparatus, causing functions/operations specified in the flowchart and/or block diagram to be implemented. The program codes may be completely executed on a computer, partially executed on a computer, executed as an independent software package, partially executed on a computer and partially executed on a remote computer, or completely executed on a remote computer or a server.

In the context of the present invention, the computer program codes or related data may be carried by any appropriate carrier, to enable a device, an apparatus, or a processor to perform various processes and operations described above. Examples of the carrier include a signal, a computer-readable medium, and the like. Examples of the signal may include an electric signal, an optical signal, a radio signal, a sound signal, or a transmission signal in another form, such as a carrier wave or an infrared signal.

A person of ordinary skill in the art may be aware that, with reference to the examples described in the examples, units and algorithm steps can be implemented by electronic hardware or a combination of computer software and electronic hardware. Whether the functions are executed by hardware or software depends on specific applications and design constraint conditions of the technical solutions. A person skilled in the art may use different methods to implement the described functions for each particular application, but it is not to be considered that the implementation goes beyond the scope of this application.

The specific implementations of the present invention are described above with reference to the accompanying drawings, but are not intended to limit the protection scope of the present invention. A person skilled in the art should understand that various modifications or deformations that may be made without creative efforts based on the technical solutions of the present invention still fall within the protection scope of the present invention.

The invention claimed is:

1. A method for managing a lithium battery, comprising:
obtaining a battery sound signal sequence of a to-be-detected lithium battery;
performing a level-1 warning of thermal runaway of the to-be-detected lithium battery, comprises:
carrying out an identification of data points with abnormal data on the obtained battery sound signal sequence, if a data point with an anomaly score in the obtained battery sound signal sequence is identified, providing an alarm that the to-be-detected lithium battery has a risk of thermal runaway; then go to a level-2 warning of thermal runaway of the to-be-detected lithium battery;
performing the level-2 warning of thermal runaway of the to-be-detected lithium battery, comprises:
extracting a time-domain feature and a frequency-domain feature of the identified abnormal data point, and detecting whether there is a sound of a expansion caused by the thermal runaway of the to-be-detected lithium battery in the time-domain feature and the frequency-domain feature; if yes, cutting off charging and discharging circuits of the to-be-detected lithium battery, performing a cooling treatment on the to-be-detected lithium battery with ventilation or carrying out a replacement on the to-be-detected lithium battery;
wherein,
in the level-1 warning, using an isolation forest algorithm to identify the data points with the abnormal data in the obtained battery sound signal sequence, comprises using a Mel-spectrogram feature as an identification feature to calculate an average path length of each data point of the obtained battery sound signal sequence in an isolation tree of the isolation forest algorithm, then calculating an anomaly score of the each data point based on the average path length, and then identifying a data point of which the calculated abnormal data is less than a set threshold value as the abnormal data point; and
in the level-2 warning, after extracting the time-domain feature and the frequency-domain feature of the identified abnormal data point, using a sparrow search algorithm-optimized eXtreme Gradient Boosting (SSA-XGBoost) algorithm to detect, in the time-domain feature and the frequency-domain feature, whether there is the sound of the expansion caused by the thermal runaway of the to-be-detected lithium battery; wherein,
in the SSA-XGBoost algorithm, performing an optimal parameter adjustment on a number of iterations, a learning rate, and a decision tree depth of the eXtreme Gradient Boosting (XGBoost) algorithm through the sparrow search algorithm (SSA); and
the extracted time-domain feature is a root mean square (RMS) energy, and the extracted frequency-domain feature comprises Mel-frequency cepstral coefficients (MFCCs), formant energy, and a spectral centroid.

2. The method for managing the lithium battery according to claim 1, wherein the average path length is:

$$L(s) = 2(\ln(s-1) + 0.5772156649) - \frac{2(s-1)}{s};$$

and, the anomaly score is:

$$C(m, s) = 2\frac{E(\ln(m) + 0.5772156649)}{L(s)};$$

wherein, s is a sample, m is a Mel-spectrogram feature, and E(ln(m)+0.5772156649) is a sample expectation.

3. The method for managing the lithium battery according to claim 1, wherein a process of performing optimal parameter adjustment through the SSA comprises: setting a range of each of the number of iterations, the learning rate, and the decision tree depth, wherein each sparrow represents a parameter combination comprising the number of iterations, the learning rate, and the decision tree depth, defining a fitness function, and updating a population position through foraging and vigilance strategies of the sparrow to gradually approximate an optimal parameter combination until a maximum number of iterations is reached, to obtain the optimal parameter combination.

4. The method for managing the lithium battery according to claim 1, wherein a loss function of the SSA-XGBoost algorithm is:

$$Q_{Obj} = \sum_{i=1}^{n} X(p_i, q_i) + \sum_{h=1}^{H} \theta(f_h);$$

wherein, $X(p_i,q_i)$ is a loss function of a key dynamic eigenvalue and a predicted value, $$\sum_{h=1}^{H} \theta(f_h)$$

is a regularization term, $p_i$ is an $i^{th}$ key dynamic eigenvalue, $q_i$ is a predicted value corresponding to $p_i$, and n is a quantity of abnormal data points; and an objective of the SSA-XGBoost algorithm is to minimize an expected value of the loss function by constructing a decision tree, perform Taylor expansion on the loss function and calculate a derivation, and finally obtain an optimal solution of an objective function as follows:

$$Q'_{Obj} = -\frac{1}{2}\sum_{j=1}^{Le} \frac{D_j^2}{E_j + \alpha} + \alpha Le;$$

wherein Le is a quantity of branches in the decision tree, $D_j$ and $E_j$ are respectively a first-order gradient function and a second-order gradient function, and a is a penalty coefficient.

5. An electronic device, comprising a memory, a processor, and a computer instruction stored in the memory and executable on the processor, wherein when the computer instruction is executed by the processor, implementing the method according to claim 1.

6. A non-transitory computer-readable storage medium, configured to store a computer instruction, wherein when the computer instruction is executed by a processor, implementing the method according to claim 1.

7. A computer program product, comprising a computer program, wherein when the computer program is executed by a processor, implementing the method according to claim 1.

* * * * *